United States Patent
Smith et al.

(10) Patent No.: US 10,802,343 B2
(45) Date of Patent: Oct. 13, 2020

(54) LOW REFLECTIVITY LCD WITH COP RETARDER AND COP MATCHING RM

(71) Applicant: Sharp Kabushiki Kaisha, Osaka (JP)

(72) Inventors: Nathan James Smith, Oxford (GB); Andrew Acreman, Oxford (GB); Hywel Hopkin, Oxford (GB); Kiyoshi Minoura, Osaka (JP); Koji Murata, Osaka (JP); Yuichi Kawahira, Osaka (JP); Akira Sakai, Osaka (JP); Jiyun Yu, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 246 days.

(21) Appl. No.: 15/918,093

(22) Filed: Mar. 12, 2018

(65) Prior Publication Data

US 2019/0278120 A1 Sep. 12, 2019

(51) Int. Cl.
*G02F 1/13363* (2006.01)
*G02F 1/1335* (2006.01)
(Continued)

(52) U.S. Cl.
CPC ...... *G02F 1/13363* (2013.01); *G02F 1/13394* (2013.01); *G02F 1/133514* (2013.01);
(Continued)

(58) Field of Classification Search
CPC ........... G02F 1/13363; G02F 1/133673; G02F 1/133638; G02F 1/133514; G02F 1/133528; G02F 1/133711; G02F 2001/133357; G02F 2001/133531; G02F 2001/133633; G02F 2001/133726; G02F 2413/02; G02F 2413/06; G02F 2413/11; Y10T 428/10; Y10T 428/1036; Y10T 428/1041
(Continued)

(56) References Cited

U.S. PATENT DOCUMENTS

2010/0134448 A1 6/2010 Park et al.
2010/0265583 A1 10/2010 Martin
(Continued)

FOREIGN PATENT DOCUMENTS

JP 2008-83492 4/2008
WO WO 2017017960 2/2017

*Primary Examiner* — Ruiyun Zhang
(74) *Attorney, Agent, or Firm* — Renner, Otto, Boisselle & Sklar, LLP (57) ABSTRACT

A liquid crystal device (LCD) is configured for minimizing unwanted internal ambient light reflections. The LCD includes a plurality of layers, the layers comprising from a viewing side: a first linear polariser; an external retarder that is made of a cyclic olefin polymer (COP) material or a cyclic olefin copolymer (COC) material; a colour filter substrate; a colour filter layer; an internal reactive mesogen (RM) retarder alignment layer; an internal reactive mesogen (RM) retarder; a liquid crystal (LC) layer; and a second linear polarizer. The external retarder and the internal RM retarder are configured such that the optical properties (for example light polarization control function) of the external retarder and the internal retarder are matched to negate each other for light passing through the external retarder and the internal RM retarder. The LCD simultaneously maintains high image quality in both high and low ambient lighting conditions.

18 Claims, 6 Drawing Sheets

(51) Int. Cl.
  *G02F 1/1337* (2006.01)
  *G02F 1/1339* (2006.01)
  *G02F 1/1333* (2006.01)

(52) U.S. Cl.
  CPC .. *G02F 1/133528* (2013.01); *G02F 1/133711* (2013.01); *G02F 2001/133334* (2013.01); *G02F 2001/133357* (2013.01); *G02F 2001/133531* (2013.01); *G02F 2001/133633* (2013.01); *G02F 2001/133638* (2013.01); *G02F 2001/133726* (2013.01); *G02F 2413/02* (2013.01); *G02F 2413/06* (2013.01); *G02F 2413/11* (2013.01); *Y10T 428/10* (2015.01); *Y10T 428/1036* (2015.01)

(58) Field of Classification Search
  USPC ........... 428/1.1, 1.3, 1.31; 349/98, 117, 118, 349/119, 97; 359/489.07, 489.11, 489.12, 359/491.01
  See application file for complete search history.

(56) References Cited

U.S. PATENT DOCUMENTS

| | | |
|---|---|---|
| 2012/0218487 A1 | 8/2012 | Lu et al. |
| 2016/0259104 A1* | 9/2016 | Lee ..................... G02B 5/3083 |
| 2017/0031206 A1 | 2/2017 | Smith et al. |

* cited by examiner

| Item | Example 1: Azimuthal orientation angle (φ) | Example 2: Azimuthal orientation angle (φ) |
|---|---|---|
| Transmission axis of CF substrate linear polariser (12) | φ=x°+90° | φ=x°+90° |
| Optical axis of external laminated Retarder (11) | φ=x°+90°+(n*45°) n=1, 3, 5 or 7 | φ=x°+90°+(n*45°) n=1, 3, 5 or 7 |
| Optical axis of internal RM retarder layer (7) | φ=x°+(n*45°) n=1, 3, 5 or 7 | φ=x°+(n*45°) n=1, 3, 5 or 7 |
| Alignment direction of CF substrate LC alignment layer (6) | φ=x°+180° | φ=x°+270° |
| Alignment direction of TFT substrate LC alignment layer (4) | φ=x° | φ=x°+90° |
| Transmission axis of TFT substrate linear polariser (1) | φ=x° | φ=x° |

LOW REFLECTIVITY LCD WITH COP RETARDER AND COP MATCHING RM

TECHNICAL FIELD

The present invention has application within the field of displays which are particularly suitable for outdoor use and other comparable potentially high ambient illumination situations.

BACKGROUND ART

In recent years, the performance of transmissive or emissive type displays, such as liquid crystal displays (LCDs) and organic light-emitting diode displays (OLEDs), has increased significantly in metrics such as resolution, colour gamut capability and brightness. Such displays also have decreased in cost such that they now form the large majority of the electronic displays market for most applications, both static and mobile, indoor and outdoor use. This has resulted in the retreat of reflective and transflective display types into niche applications for very high ambient illumination applications, and long battery life requirement applications.

Even applications which until very recently a reflective display technology was preferred, such as outdoor signage, e-readers and smart wristwatches, and similar devices commonly used outdoors, are now largely being served by transmissive or emissive devices, due to their increased image quality capability. In these areas, and others in which a display device may be intended for use mainly in moderate ambient light, or only occasionally high ambient light situations, such as smartphones, tablets, automotive displays and notebook PCs, attempts have been made to modify transmissive or emissive type displays to have improved performance in higher ambient lighting situations, with minimal impact on cost and dark room performance. Such modifications include the use of anti-reflection or anti-glare films to reduce reflections from the front surface of the display, and a circular front polariser to absorb reflection of ambient light from within the display. Circular polarisers are particularly effective at removing internal reflections, and as a result are used in displays such as LCDs in which higher dark room contrast may be obtained using standard linear polarisers (also sometimes referred to as plane polarizers), and OLEDs which do not use polarised light and therefore an emitted brightness loss is incurred.

The dominant LCD display technology for high resolution, narrow-bezel, wide-viewing angle applications, such as smartphones and tablets, utilizes a Fringe-Field Switching (FFS) mode. The FFS mode is not conventionally compatible with circular polarisers, as at all voltage conditions, including zero, they have an LC director orientation, and therefore optic axis, with a large component in the polarisation plane of on-axis light, so no black state is achievable. This is also true for other commonly used LC modes such as In-Plane Switching (IPS), Twisted Nematic (TN) and Electrically Controlled Birefringence (ECB). These LC modes rely on the use of linear polarisers having a transmissive axis aligned parallel or orthogonal to the projection of the optical axis of the LC in the plane of the cell, in at least one of the display voltage states to produce a particular transmission condition.

US 2010/0134448 (Park et al., published Jun. 3, 2010) describes the use of phase compensation (retarder) films integrated into a touch panel to improve the outdoor visibility and viewing angle characteristics of an LCD. JP 2008-83492 (Epson Imagining Devices Co., Ltd) describes the use of phase compensation (retarder) films for preventing deterioration in display quality due to static electricity and reflected light. US 2017/0031206 (Smith et al., published Feb. 2, 2017) and commonly assigned PCT/JP2016/003507 describe the use of phase compensation (retarder) films for preventing deterioration in display quality due to reflected light.

SUMMARY OF INVENTION

It is desirable to provide an LC display in which an LC mode configuration typically used in conjunction with linear polarisers for optimum low ambient light image quality is utilized with a circular front polariser to improve high ambient lighting appearance, via absorption of the uncontrolled ambient light reflection from internal display components, while retaining the high quality transmissive display performance associated with the LC mode. While light transmitted by the display from the backlight to the viewer is modulated by the LC layer as expected to give the intended transmission, in conventional configurations unwanted ambient light reflected from internal layer interfaces is re-emitted (reflected) without control in all LC states, resulting in reduced contrast ratio for the display and degraded image quality.

The present disclosure relates to display configurations that reduce ambient light reflections in liquid crystal devices (e.g., displays and light modulators), and, more particularly from IPS or FFS type displays so as to provide enhanced contrast ratio and image quality particularly in conditions of high ambient light. More generally, this disclosure relates to reducing ambient light reflections in liquid crystal devices such as displays and light modulators that are normally operated with at least a first linear polariser and often with a second linear polariser, such as FFS, IPS, VAN, TN modes and the like. Accordingly, ambient light reflections are reduced in liquid crystal devices that are not normally used with circular polarisers.

In embodiments described in this disclosure, enhanced contrast ratio and overall performance are achieved via (i) the addition of at least one uniform, unpatterned retarder layer on an inner surface of the LC cell and (ii) the use of a circular polariser, comprised of an external retarder layer and a linear polariser, on an outside surface of the LC cell. The external retarder and the internal retarder effectively cancel as completely as possible each other's polarisation control function for all wavelengths transmitted by the LCD, thus ensuring high contrast ratio for images viewed in dark room (low ambient lighting) conditions. The circular polariser significantly reduces unwanted ambient reflections from inner surfaces of the LC cell, thus ensuring high contrast ratio for images viewed in high ambient lighting conditions. It is well known that LCDs that are conventionally operated with two linear polarisers (no circular polarisers), such as FFS, IPS, TN and like display technologies, have lower contrast ratio for images viewed in high ambient lighting conditions than for images viewed under the same ambient lighting conditions on LCDs that are conventionally operated with two circular polarisers. However, it is not possible to simply replace the linear polarisers for circular polarisers in displays such as FFS, IPS, and TN displays without significantly degrading the image quality. Aspects of the current invention demonstrate how additional optical layers, such as an internal retarder and an external retarder, may be added to an LCD that is conventionally operated with two linear polarisers to enable the viewing of high contrast ratio images in both low and high ambient lighting conditions.

The present invention results in an LC display configured for optimum low ambient light image quality and improved high ambient lighting appearance, via absorption of the uncontrolled ambient light reflection from internal display components, while retaining the high quality transmissive display performance associated with the LC mode. Ambient light reflections in liquid crystal displays are thereby by reduced, and more particularly from IPS or FFS type displays, so as to provide enhanced contrast ratio and image quality.

An aspect of the invention, therefore, is a liquid crystal device (LCD) that is configured for minimizing unwanted ambient light reflections particularly from internal components. In exemplary embodiments, the LCD includes a plurality of layers, the layers comprising from a viewing side: a first linear polariser; an external retarder that is made of a cyclic olefin polymer (COP) material or a cyclic olefin copolymer (COC) material; a colour filter substrate; a colour filter layer; an internal reactive mesogen (RM) retarder alignment layer; an internal reactive mesogen (RM) retarder; a liquid crystal (LC) layer; and a second linear polarizer. The external retarder and the internal RM retarder are configured such that optical properties (for example light polarization control function) of the external retarder and the internal retarder are matched to negate each other for light passing through the external retarder and the internal RM retarder, thereby minimizing said unwanted internal ambient light reflections. An azimuthal angle between the first and second linear polarisers may be 90°, an azimuthal angle between the first linear polariser and the external retarder may be 45°, and an azimuthal angle between the internal RM retarder and external retarder may be 90°.

In exemplary embodiments, the internal RM retarder and the external retarder layer each has a retardation value in a range of 110 nm to 165 nm measured at 550 nm, and a difference in retardation values measured at 550 nm between the internal RM retarder layer and the external retarder layer is 0 nm to 10 nm. As used herein, R450 denotes retardation of blue light measured at 450 nm, R550 denotes retardation of green light measured at 550 nm, and R650 denotes retardation of red light at 650 nm. In exemplary embodiments, the internal RM retarder layer has a value of R450/R550 in a range of 0.95 to 1.07 (1.01±0.06), and a value of R650/R550 in a range of 0.93 to 1.05 (0.99±0.06).

To the accomplishment of the foregoing and related ends, the invention, then, comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

DESCRIPTION OF EMBODIMENTS

Figure 1:
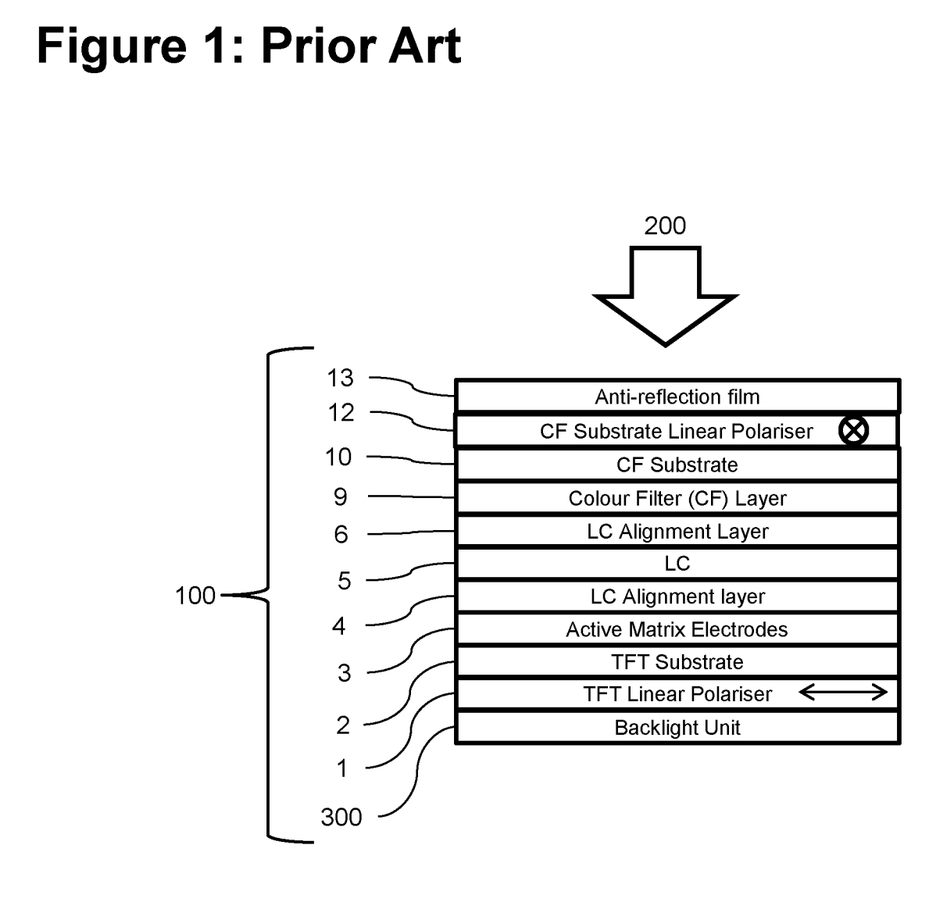
FIG. 1 is a schematic drawing of an optical stack arrangement of an LCD as is conventional in the art.

For comparison purposes for illustrating the enhancements of the present invention, FIG. 1 is a schematic drawing of an optical stack arrangement of an LCD as is conventional in the art. Referring to FIG. 1, a transmissive FFS or IPS type LCD 100 of a conventional configuration, which may be considered standard in the art, typically comprises an optical stack configuration in which the liquid crystal (LC) material 5 is sandwiched between a TFT substrate 2 and colour filter (CF) substrate 10 with a uniform cell gap of typically 3-5 μm. First and second LC alignment layers 4 and 6 are disposed on the inner surfaces of the TFT substrate and CF substrate adjacent to the LC material to promote a uniform, antiparallel planar alignment of the LC. A colour filter (CF) layer 9 is disposed on the colour filter substrate 10, and an active-matrix pixel array and drive electronics 3 are disposed on the inner surface of the thin film transistor (TFT) substrate 2. Linear polarisers 1 and 12 are laminated onto the outer surfaces of both the TFT substrate and CF substrate, resulting in the transmission of linearly polarised light into the display stack from both the backlight 300 and from ambient illumination on the viewing side 200.

The viewing side sometimes is referred to as the viewer side or the outer side of the LCD, and is the side at which a person typically would look at or view images on the LCD, from which images may be provided for projection, and so on. Relative to the illustrations in the drawings, the top, upper or outer side of the LCD or of an element, component or layer of the LCD is at the top of the respective illustrations, e.g., is closer to the viewing side than to the other side of the LCD, which commonly is referred to as the non-viewing side, bottom, lower, inner, or back side, or in some cases the backlight-side of the LCD. In some instances the term "inner surface" may represent a surface that is inside the stack of components or layers of the LCD, e.g., between the respective TFT substrate 2 and CF substrate 10 of the LCD, as will be evident from the description with reference to the illustrations in the respective drawings. The term "external" generally refers to a location not between the TFT substrate 3 and CF substrate 10. The term "internal" generally refers to a location between the TFT substrate 2 and CF substrate 10.

A disadvantage of the transmissive FFS or IPS type LCD 100 shown in FIG. 1 is that a portion of the ambient lighting (such as sunshine etc.) incident upon the FFS or IPS type LCD 100 from the viewing side 200 is reflected back to the viewer. This unwanted reflected light degrades the perceived image quality of the FFS or IPS type LCD 100. In particular, the reflected light degrades the perceived contrast ratio of the FFS or IPS type LCD 100. A first portion of unwanted reflected ambient light comes from the upper-most layer on the viewing side and is referred to as external reflections as these unwanted reflections occur external to the image forming components of the FFS or IPS type LCD 100. In other words, external reflections have occurred from components not situated between the TFT substrate 2 and the CF substrate 10. This first portion of light reflected from FFS or IPS type LCD 100 can be reduced by use of an anti-reflection film 13 that is deposited on the viewing side of the first linear polarizer 12, and typically is the upper-most layer closest to the viewing side of the FFS or IPS type LCD 100.

A second portion of unwanted reflected ambient light comes from the materials and interfaces used within the transmissive FFS or IPS type LCD 100, and these unwanted reflections are therefore referred to as internal reflections. In other words, internal reflections have occurred from components situated between the TFT substrate 2 and the CF substrate 10. The total portion of unwanted reflected light is the sum of the first portion (unwanted external reflections) and second portion (unwanted internal reflections). Although a high quality anti-reflection film can significantly suppress unwanted external reflections, the unwanted internal reflections must be reduced to maintain high image quality of the FFS or IPS type LCD 100.

Configurations intended for suppressing the unwanted internal reflections have been attempted. For example, suppression of unwanted internal reflections via the use of an internal optical retarder film and an external optical retarder film has been previously disclosed (see US 2017/0031206, cited in the background section above). In exemplary embodiments of the present invention, optimum materials and processing conditions for the external retarder and internal retarder are disclosed as inventive improvements over such previous configuration. Further in exemplary embodiments of the present invention, optimum orientations for the external and internal retarders in relation to other optical components of an FFS or IPS type LCD are disclosed. Further in exemplary embodiments of the present invention, additional components of an FFS or IPS type LCD are disclosed for improved display performance.

An aspect of the invention, therefore, is a liquid crystal device (LCD) that is configured for minimizing unwanted ambient light reflections particularly from internal components. In exemplary embodiments, the LCD includes a plurality of layers, the layers comprising from a viewing side: a first linear polariser; an external retarder that is made of a cyclic olefin polymer (COP) material or a cyclic olefin copolymer (COC) material; a colour filter substrate; a colour filter layer; an internal reactive mesogen (RM) retarder alignment layer; an internal reactive mesogen (RM) retarder; a liquid crystal (LC) layer; and a second linear polarizer. The external retarder and the internal RM retarder are configured such that optical properties (for example light polarization control function) of the external retarder and the internal retarder are matched to negate each other for light passing through the external retarder and the internal RM retarder, thereby simultaneously minimizing said unwanted internal ambient light reflections and maintaining high contrast ratio for displayed images.

Figure 2:
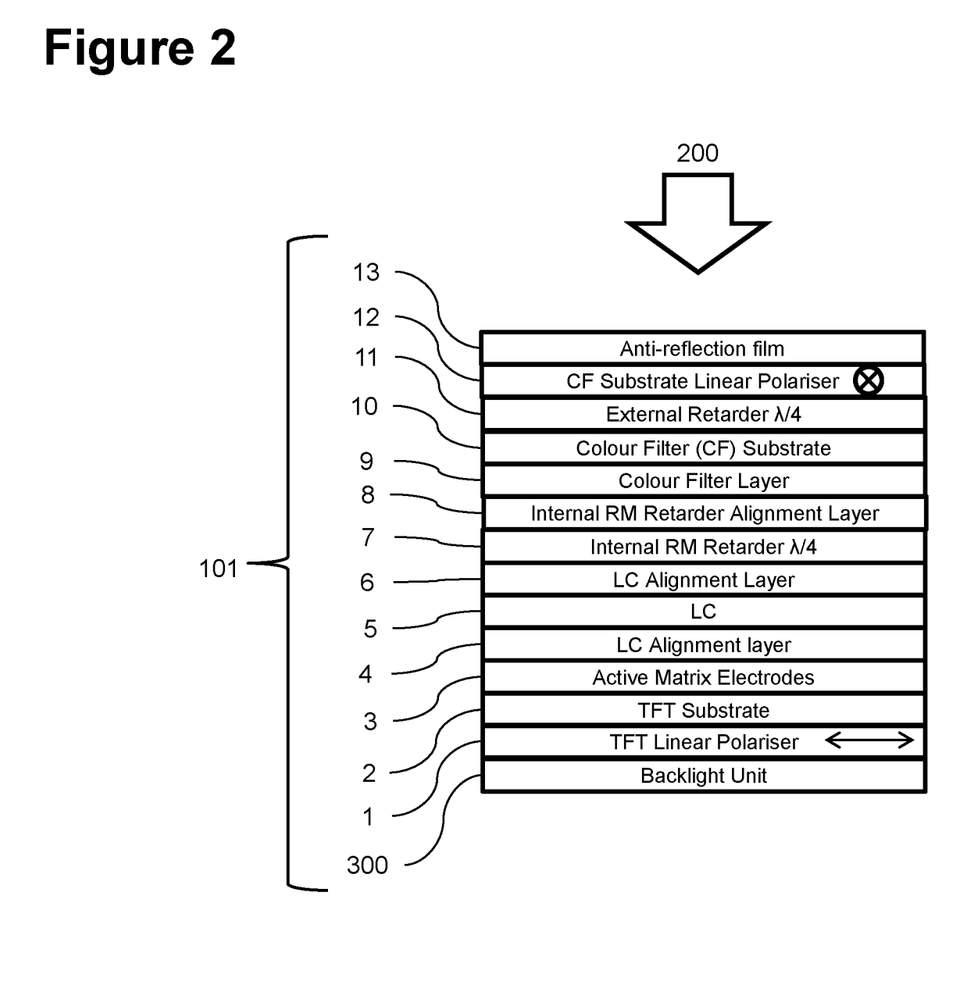
FIG. 2 is a schematic drawing of an exemplary LCD optical stack arrangement in accordance with embodiments of the present invention.

FIG. 2 is a schematic drawing of an exemplary LCD optical stack arrangement 101 in accordance with embodiments of the present invention.

Referring to FIG. 2, an FFS or IPS type LCD 101 is configured in a manner that significantly suppresses unwanted internal reflections is described. Some components are comparable as in the conventional configuration of FIG. 1, so like components are identified with like reference numerals. From the viewing side, the FFS or IPS type LCD 101 includes the anti-reflection film 13, the CF substrate linear polariser 12, an external retarder 11, the colour filter (CF) substrate 10, the colour filter layer 9, an internal reactive mesogen (RM) retarder alignment layer 8, an internal reactive mesogen (RM) retarder layer 7, the LC alignment layer 6, the LC layer 5, the LC alignment layer 4, the active matrix electrode layer 3, the TFT substrate 2, the TFT linear polariser 1, and the backlight unit 300. All components, excluding the backlight unit 300, described in the FFS or IPS type LCD 101 may be adhered together to prevent the formation of air gaps. All retarders described herein are optical retarders that may change the polarisation state of light. Accordingly, comparing FIG. 2 to FIG. 1, the LCD 101 includes the following additional layers that are not included in the conventional LCD 100: the external retarder 11, the internal RM retarder alignment layer 8, and the internal RM retarder 7.

The alignment direction of the internal reactive mesogen (RM) retarder alignment layer 8 may be formed via a rubbing process or a UV photo-alignment process. If a UV photo-alignment process is used, 254 nm UV radiation may be used (bond-breaking photo-alignment) or 365 nm UV radiation may be used (bond-making photo-alignment). The alignment direction of the internal reactive mesogen (RM) retarder alignment layer 8 defines the alignment direction of the optical axis of the internal reactive mesogen RM retarder layer 7.

To ensure that the FFS or IPS type LCD 101 shown in FIG. 2 has the same dark room (i.e. in the absence of ambient lighting) image quality as the FFS or IPS type LCD 100 shown in FIG. 1, the external optical retarder 11 and the internal RM retarder layer 7 are configured so that their optical properties are matched to negate each other for light passing through the external retarder and the internal RM retarder. The external retarder 11 and the internal RM retarder layer 7 in particular are configured such that their polarisation control functions are matched to negate each other. For example, if light that originates from the backlight has its polarisation state modified from a linearly polarised state to a left-handed circularly polarised state by the internal RM retarder layer 7, then the external optical retarder 11 will convert said left-handed circularly polarised state back to said linearly polarised state. Also for example, if light that originates from an ambient light source (e.g., sunshine or other external light) has its polarisation state modified from a linearly polarised state to a left-handed circularly polarised state by the external optical retarder 11, then the internal RM retarder layer 7 will convert said left-handed circularly polarised state back to said linearly polarised state. More generally, the effect of the retarder layers 7 and 11 will then be for each to rotate the major axis of the polarisation ellipse and alter the ellipticity, but oppositely in each case, so when considered in combination, the retarder layers 7 and 11 do not change the polarisation state of the light that passes from the backlight 300 to the linear polariser 12.

Referring to FIG. 2, the external retarder 11 is a laminated film, and particularly may be configured as a quarter wave plate (QWP or λ/4) film. The external retarder 11 is a positive uniaxial material. In other words, the external retarder 11 is a positive A-plate, and is orientated at substantially 45° (±10°) to the CF linear polariser 12. Ambient light from the viewing side becomes circularly polarised after traversing the combination of the CF linear polariser 12 and external retarder 11. Reflection of circularly polarised light from components below, i.e. further from the viewing side relative to the external retarder 11, will be absorbed by the CF linear polariser 12, and thus unwanted internal reflections are significantly reduced. The external retarder 11 and the CF linear polariser 12 may be fabricated as a composite film that forms a resultant circular polariser.

The external retarder 11 is fabricated from a Cyclo Olefin Polymer (COP) material or a Cyclo Olefin Copolymer (COC) material. An advantage of the COP or COC material is that the retardation versus wavelength is a relatively flat functional form for all optical wavelengths (red, green and blue). COP and COC materials have a relatively flat dispersion curve. A flat dispersion curve enables the combination of the external retarder 11 and CF linear polariser 12 to produce circularly polarised light across the visible spectrum, and therefore significantly reduce internal reflections in the manner described above. Another advantage of the COP or COC material is that the COP or COC materials are found by the inventors to be robust to the external environmental conditions. Accordingly, the optical properties of the external optical retarder 11 remain unaffected by high ambient lighting conditions, large ambient temperature variations and large ambient humidity variations. Consequently, regardless of the environmental conditions, the external optical retarder 11 and CF linear polariser 12 produce high quality circularly polarised light across the visible spectrum, and therefore significantly reduce internal reflections. The use of COP or COC material achieves unexpected and enhanced results as compared to conventional configurations, in that one can formulate an RM material with the same dispersion characteristics as the COP or COC material, such that the external optical retarder 11 and the internal RM retarder layer 7 have optical functions that negate each other. Example COP or COC materials that may be used in the present invention include comparable materials as used in products such as, for example, NZF-UF01A (Nitto Denko), ZeonorFilm® (Zeon Corporation) and Arton Film® (JSR).

The internal RM retarder layer 7 may be coated onto the internal RM retarder alignment layer 8. The RM coating method may be a slot-die coating method or a spin coating method as are used in the art. The internal RM retarder layer 7 may be configured as a quarter wave plate (QWP or $\lambda/4$) film, and is a positive uniaxial material. The internal RM retarder layer 7 thus is a positive A-plate. The internal RM retarder layer is orientated at substantially 90° (±10°) to the external optical retarder 11. An advantage of using an RM material for the internal RM retarder layer 7 is that the thickness required to achieve a QWP function can be sufficiently thin to minimise colour artefacts that degrade the dark room image quality. Comparably as above, unexpected and enhanced results are achieved by using an RM material for the internal RM retarder layer 7, in that one can formulate an RM material with the same dispersion characteristics as the COP or COC material, such that the external optical retarder 11 and the internal RM retarder layer 7 have optical functions that negate each other. The internal RM retarder layer 7 may have a thickness less than 3.0 µm, and particularly may have a thickness less than 1.0 µm.

To operate as described, with minimal impact on the dark-room transmissive display quality, and in particular contrast ratio, the laminated quarter wave plate external retarder 11 and the internal RM quarter wave plate retarder 7 should operate to effectively cancel as completely as possible each other's polarisation control function for all wavelengths transmitted by the LCD. It is an unexpected and enhanced result that the RM material may be formulated so that after all manufacturing processes are complete, the dispersion of the of the internal RM quarter wave plate retarder 7 closely matches that of the dispersion of the external laminated quarter wave plate retarder 11, and thus ensures a display with high image quality because darkroom contrast ratio is high and reflections from ambient light sources are low. Therefore, matching the optical properties, in particular the polarization function of the external laminated quarter wave plate retarder 11 and the internal reactive mesogen quarter wave plate retarder 7, represents a solution with unexpected and enhanced results in terms of optical performance, high durability and relatively low cost.

The internal RM retarder layer 7 and the external retarder layer 11 may have retardation values in the range 110 nm to 165 nm measured at 550 nm. In a preferred embodiment, the internal RM retarder layer 7 and the external retarder layer 11 may have retardation values in the range 130 nm to 145 nm measured at 550 nm. The difference in retardation values measured at 550 nm between the internal RM retarder layer 7 and the external retarder layer 11 may be approximately 0 nm to 10 nm, and preferably less than 5 nm. In general, a smaller difference in retardation at a given wavelength for the internal RM retarder layer 7 and the external retarder layer 11 enables a displayed image with higher contrast ratio. Therefore, a smaller difference in retardation at a given wavelength for the internal RM retarder layer 7 and the external retarder layer 11 is preferable. In general, a smaller difference in retardation for the internal RM retarder layer 7 and the external retarder layer 11 for all optical wavelengths is preferable.

It may be difficult to maintain the same retardation difference for the internal RM retarder layer 7 and the external retarder layer 11 for each optical wavelength. Therefore, it may be preferable to minimize the retardation difference for the internal RM retarder layer 7 and the external retarder layer 11 for short optical wavelengths (i.e. the blue part of the visible spectrum). Alternatively, it may be preferable to minimize the retardation difference for the internal RM retarder layer 7 and the external retarder layer 11 for mid optical wavelengths (i.e. the green part of the visible spectrum). Alternatively, it may be preferable to minimise the retardation difference for the internal RM retarder layer 7 and the external retarder layer 11 for long optical wavelengths (i.e. the red part of the visible spectrum).

For the following discussion, let "R650" denote the retardation of red light measured at 650 nm, "R550" denote the retardation of green light measured at 550 nm, and "R450" denote the retardation of blue light measured at 450 nm. It has been shown that an LCD device has acceptable image quality in terms of contrast ratio when the internal reactive mesogen quarter wave plate retarder 7 has the value of R450/R550 in the range of 0.95 to 1.07 (1.01±0.06), and the value of R650/R550 in the range of 0.93 to 1.05 (0.99±0.06). Further enhanced image quality has been shown for an LCD device in terms of contrast ratio when the internal reactive mesogen quarter wave plate retarder 7 has the value of R450/R550 in the range of 0.97 to 1.05 (1.01±0.04), and the value of R650/R550 in the range of 0.95 to 1.03 (0.99±0.04). Even further enhanced image quality has been shown for an LCD device in terms of contrast ratio when the internal reactive mesogen quarter wave plate internal retarder 7 has the value of R450/R550 in the range of 0.99 to 1.03 (1.01±0.02), and the value of R650/R550 in the range of 0.97 to 1.01 0.99±0.02.

In addition, it has been shown that an LCD device has acceptable image quality in terms of contrast ratio when the external laminated quarter wave plate retarder 11 has the value of R450/R550 in the range of 0.95 to 1.07 (1.01±0.06), and the value of R650/R550 in the range 0.93 to 1.05 (0.99±0.06). Further enhanced image quality has been shown for an LCD device in terms of contrast ratio when the external laminated quarter wave plate retarder 11 has the value of R450/R550 in the range of 0.97 to 1.05 (1.01±0.04), and the value of R650/R550 in the range 0.95 to 1.03 (0.99±0.04). Even further enhanced image quality has been shown for an LCD device in terms of contrast ratio when the external laminated quarter wave plate retarder 11 has the value of R450/R550 in the range of 0.99 to 1.03 (1.01±0.02), and the value of R650/R550 in the range of 0.97 to 1.01 (0.99±0.02).

In addition, it has been shown that the LCD device has acceptable image quality in terms of contrast ratio when both the internal reactive mesogen quarter wave plate retarder 7 and external laminated quarter wave plate retarder 11 have values of R450/R550 in the range of 0.95 to 1.07 (1.01±0.06), and values of R650/R550 in the range of 0.93 to 1.05 (0.99±0.06). Further enhanced image quality has been shown for an LCD device in terms of contrast ratio when both the internal reactive mesogen quarter wave plate retarder 7 and external laminated quarter wave plate retarder 11 have values R450/R550 in the range of 0.97 to 1.05 (1.01±0.04), and values of R650/R550 in the range of 0.95 to 1.03 (0.99±0.04). Even further enhanced image quality has been shown for an LCD device in terms of contrast ratio when both the internal reactive mesogen quarter wave plate retarder 7 and external laminated quarter wave plate retarder 11 have values R450/R550 in the range of 0.99 to 1.03 (1.01±0.02), and values of R650/R550 in the range of 0.97 to 1.01 (0.99±0.02). Configurations of broader tolerance ranges tend to be easier to manufacture, but have lower image contrast ratio. Conversely, configurations with a narrower tolerance range tend to be harder to manufacture, but have higher image contrast ratio. A broader tolerance range also has more flexibility on design of RM material chemistry.

An advantage of an external laminated quarter wave plate retarder 11 is that circular polariser films comprised of a linear polariser 12 plus a laminated quarter wave plate 11 are relatively inexpensive and durable. Environmental durability is significant for the external quarter wave plate 11. In addition, an advantage of an internal reactive mesogen quarter wave plate retarder 7 is that such a retarder is considerably thinner than the external laminated quarter wave plate 11, and therefore the internal reactive mesogen quarter wave plate retarder 7 will not have a detrimental effect on the liquid crystal cell gap. A further advantage of using a relatively thin internal reactive mesogen quarter wave plate retarder 7 is the avoidance of colour artefacts. Colour artefacts occur when light from a first pixel region passes through the colour filter of a second pixel, whereby the first and second pixel regions are of the same or different colours. This type of colour artefact is minimised by minimising the thickness of the reactive mesogen quarter wave plate retarder 7. Accordingly, a combination of an external laminated quarter wave plate retarder 11 and an internal reactive mesogen quarter wave plate retarder 7 represents a solution with unexpected and enhanced results in terms of optical performance, durability and low cost.

Figure 3:
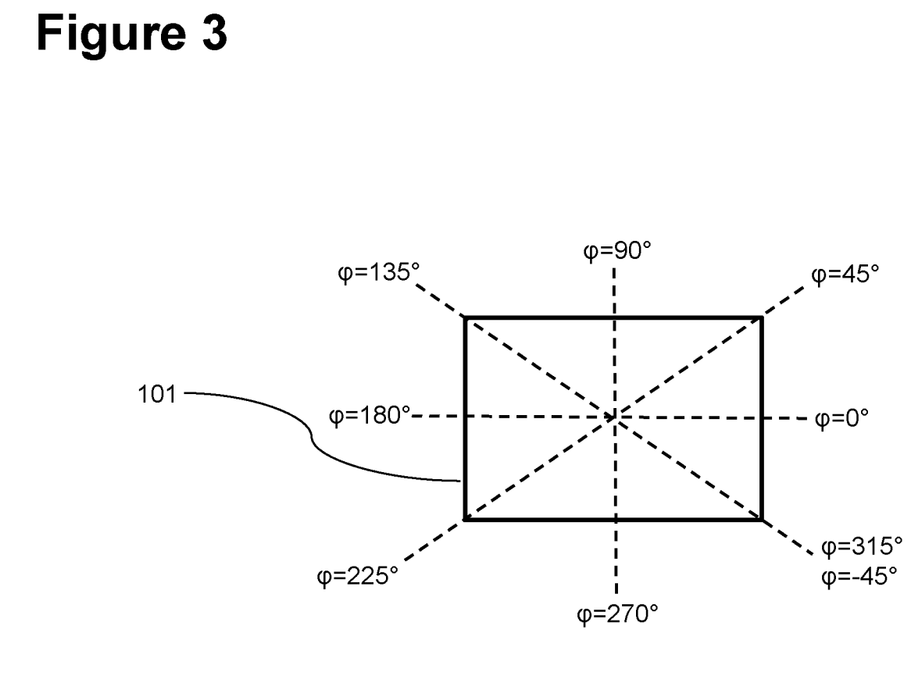
FIG. 3 is a drawing that defines the azimuthal orientation directions of the LCD in accordance with embodiments of the present invention.
Figure 4:
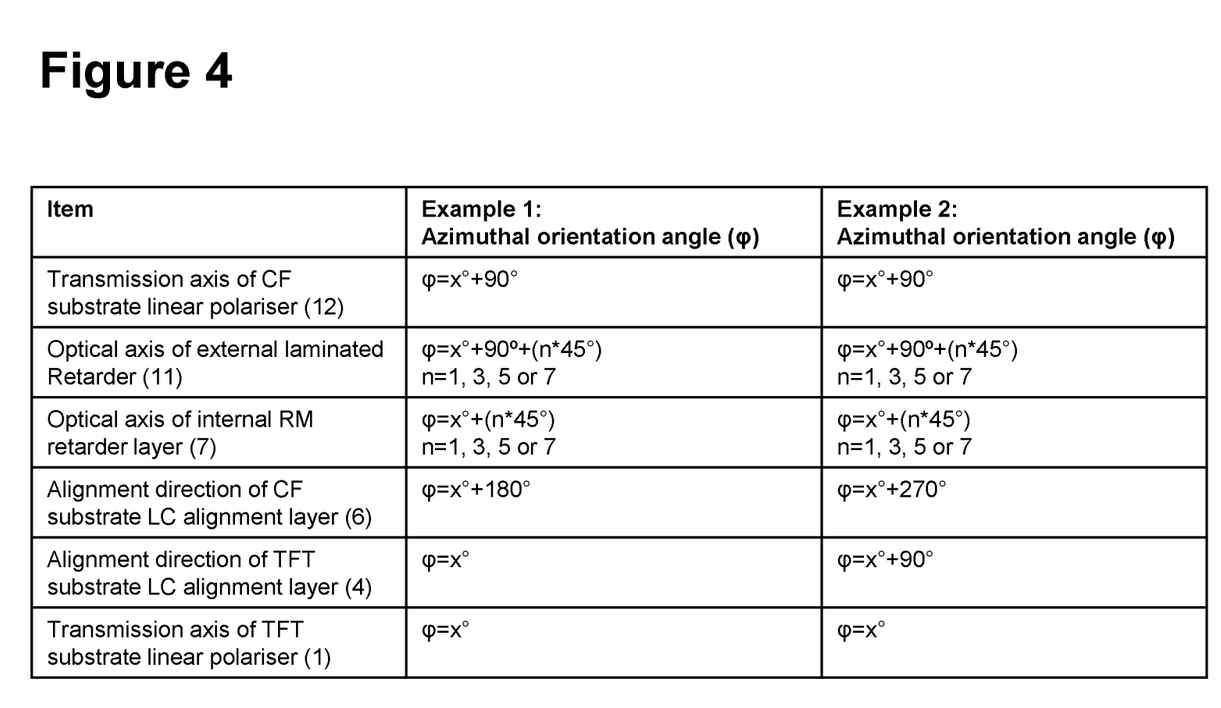
FIG. 4 is a chart that defines the azimuthal orientation directions of some optical components pertaining to the LCD shown in FIG. 2.

FIG. 3 is a drawing that defines the azimuthal orientation directions in an LCD device configured as described, and FIG. 4 is a chart that defines the azimuthal orientation directions of some of the optical components. Referring to FIG. 3, a plan view of the FFS or IPS type LCD 101 is shown with azimuth orientation angle, φ, shown. Referring to FIG. 4, a table of components within the FFS or IPS type LCD 101 is shown along with azimuthal orientation angles for the respective components, which include: transmission axis of TFT substrate linear polariser 1, alignment direction of TFT substrate LC alignment layer 4, alignment direction of CF substrate LC alignment layer 6, optical axis of internal RM retarder layer 7, optical axis of external laminated retarder 11 and transmission axis of CF substrate linear polariser 12. The azimuthal orientation direction of the internal RM retarder alignment layer 8 and optical axis of internal RM retarder layer 7 are always the same.

Although precise values are shown for all azimuthal orientation angles (φ) in FIG. 4, it will be appreciated that manufacturing tolerances and related processing can limit the accuracy that can be obtained. Therefore, the azimuthal orientation angles (φ) referred to in FIG. 4 are aspirational for optimum performance. Referring to FIG. 4, the value of x° may take any value between 0° and 36°, and most commonly has a value of 0° or 90°. Components such as the linear polarisers 1, 12 and the retarders 7, 11 have symmetry such that alignment directions of φ and φ+180° are equivalent. Also referring to FIG. 4, the value of "n" may take the values 1, 3, 5, 7 etc. The difference in azimuthal orientation angle of the alignment direction of TFT substrate LC alignment layer 4 and the alignment direction of CF substrate LC alignment layer 6 is always 180° for a non-zero LC pretilt angle. In other words, the LC alignment is anti-parallel for LCs with a non-zero pretilt. If the LC has no pretilt angle, then the difference between the alignment direction of CF substrate LC alignment layer 6 and the alignment direction of TFT substrate LC alignment layer 4 may be 0° or 180°.

The difference in azimuthal orientation angle of the transmission axis of CF substrate linear polariser 12 and optical axis of external laminated retarder 11 is 45°, such that the CF substrate linear polariser 12 and the optical axis of external laminated retarder 11 form a circular polariser. The difference in azimuthal orientation angle of the optical axis of external laminated retarder 11 and the optical axis of internal RM retarder layer 7 is 90°, i.e. the polarisation functions of the external laminated retarder 11 and the internal RM retarder layer 7 cancel each other for light transmitted through both retarders 7, 11. The difference in azimuthal orientation angle of the transmission axis of CF substrate linear polariser 12 and transmission axis of TFT substrate linear polariser 1 is 90°, i.e. the linear polarisers 1 and 12 are crossed. Unless stated otherwise, the azimuthal orientation angles of the components shown in FIG. 4 apply to all subsequent embodiments.

Figure 5:
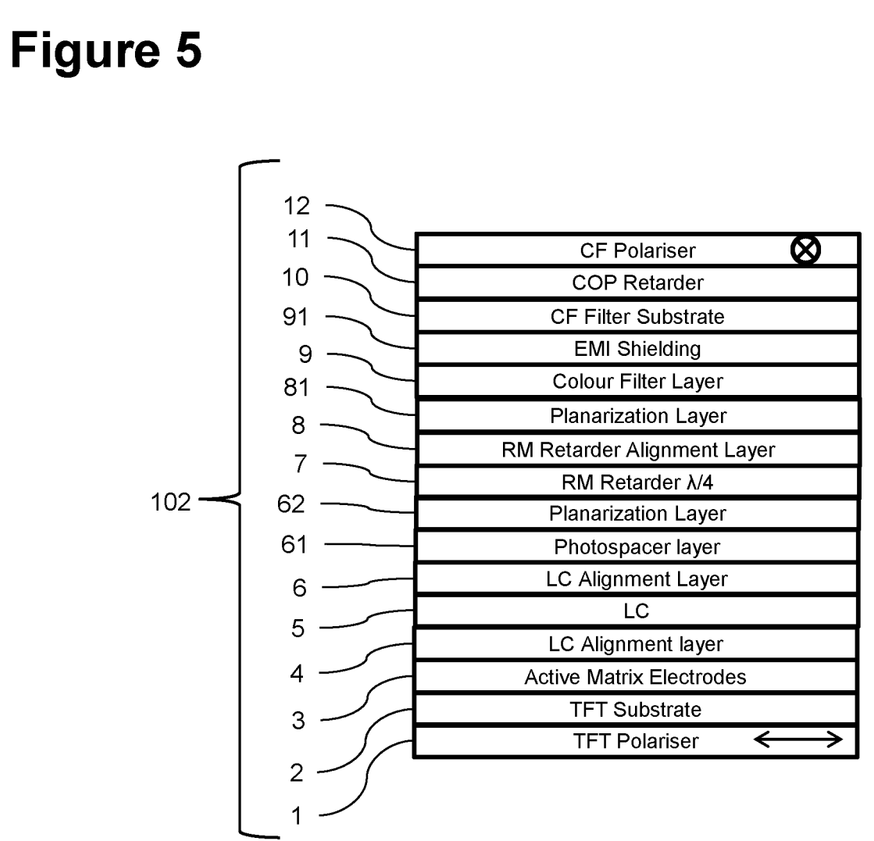
FIG. 5 is a schematic drawing of another LCD optical stack arrangement in accordance with embodiments of the present invention.

FIG. 5 is a schematic drawing of another LCD optical stack arrangement in accordance with embodiments of the present invention. FIG. 5 depicts an FFS or IPS type LCD 102 that also significantly suppresses unwanted internal reflections, and has additional components that further improve image quality. Accordingly, components in common with previous embodiments are identified with like reference numerals, with the additional components identified in FIG. 5. The FFS or IPS type LCD 102 further includes an electromagnetic shielding layer 91 that may be deposited onto the CF substrate 10 and is positioned between the colour filter substrate 10 and the colour filter layer 9. The electromagnetic shielding layer 91 is a conductive layer and may be an ITO layer.

The FFS or IPS type LCD 102 further includes a first planarization layer 81 that may be deposited on a non-viewing side of the colour filter layer 9 and is used to eliminate surface roughness of the colour filter layer 9. It is desirable that the planarization layer 81 be as thin as possible to avoid colour artefacts. The thickest part of the planarization layer 81 may be less than 5 µm, and in exemplary embodiments is less than 2 µm.

The FFS or IPS type LCD 102 further includes a second planarization layer 62 that may be deposited on a non-viewing side of the internal RM retarder layer 7 and is used to eliminate surface roughness of the internal RM retarder layer 7. It is desirable that the second planarization layer 62 also be as thin as possible to avoid colour artefacts. The thickest part of the planarization layer 62 may be less than 2 µm, and more preferably the thickest part of the planarization layer 62 may be less than 1 µm.

The FFS or IPS type LCD 102 further includes a photo-spacer layer 61 that may be deposited on the non-viewing side of the internal RM retarder 7. For example, the photo-spacer layer 61 may be deposited on the second planarisation layer 62 as shown in FIG. 5. If a second planarisation layer 62 is not used, then the photospacer layer 61 may be deposited directly on the internal RM layer 7. The purpose of the photospacer layer 61 is to maintain a uniform thickness of the LC layer 5.

Figure 6:
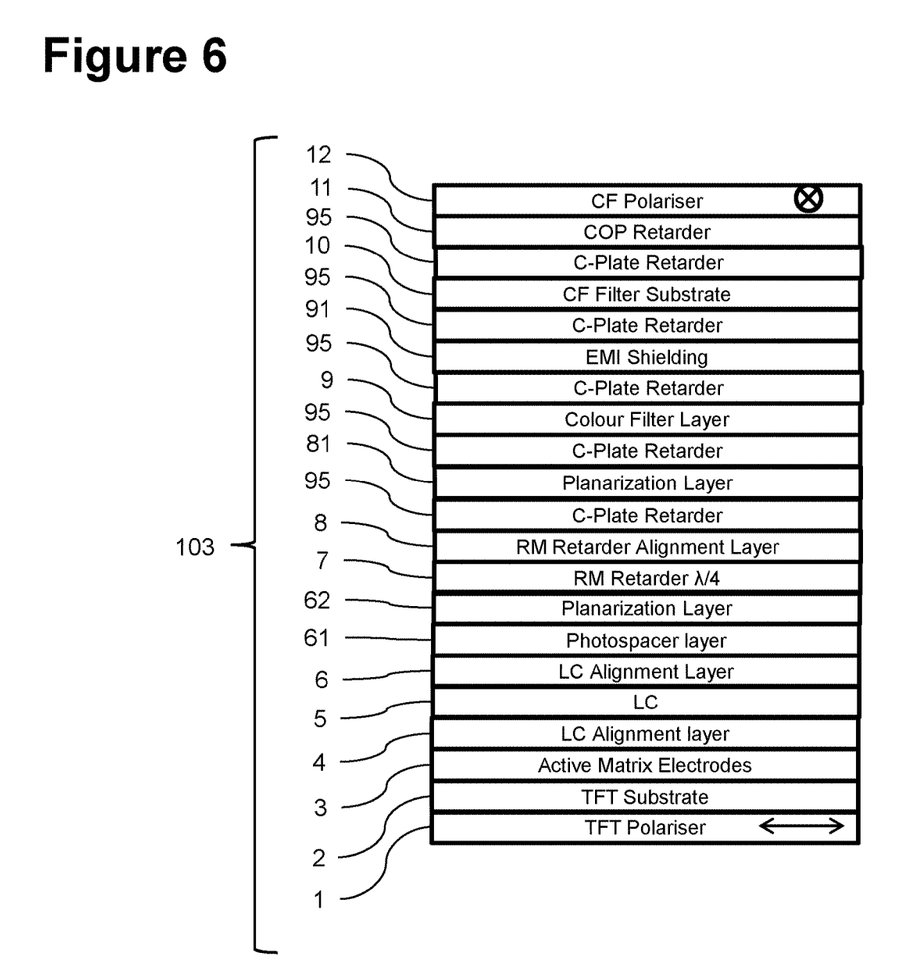
FIG. 6 is a schematic drawing of another LCD optical stack arrangement in accordance with embodiments of the present invention.

FIG. 6 is a schematic drawing of another LCD optical stack arrangement in accordance with embodiments of the present invention. The FFS or IPS type LCD 103 is a modification to the FFS or IPS type LCD 102 and includes a positive uniaxial retarder 95 with optical axis orientated in the viewing direction (i.e., a positive C-plate retarder) that may be positioned between the external retarder 11 and internal RM retarder 7. In other words, at least a first positive C-plate retarder 95 may be positioned between the external retarder 11 and internal RM retarder 7. Although FIG. 6 shows all the possible locations for the positive C-plate retarder 95, the positive C-plate retarder 95 may take at least one of the positions as shown in FIG. 6. For example, positive uniaxial retarder 95 may just be located between the external retarder 11 and CF Substrate 10.

The purpose of the positive C-plate retarder is to compensate for the off-axis viewing degradation that can occur due to the combination of the external retarder 11 and internal RM retarder 7. The positive C-plate retarder may have a retardation value in the range of 80 nm-200 nm. The optimal positive retardation value for the positive C-plate retarder may depend on the biaxiality of external retarder 11. The positive C-plate retarder may be a film laminated to the exterior of the FFS or IPS type LCD 102, for example, between the external retarder 11 and the CF substrate 10. The positive C-plate retarder may be part of a composite film that also contains the external retarder 11. The positive C-plate retarder may be part of a composite laminated film that also contains the external retarder 11 and the linear polariser 12. The positive C-plate retarder may be an RM layer disposed on the interior of the FFS or IPS type LCD 102, positioned between the internal RM retarder 7 and the colour filter substrate 10. If the positive C-plate retarder is an RM layer, then an appropriate alignment layer (not shown) may be required. The alignment layer for the RM positive C-plate retarder layer may promote vertical alignment of the RM molecules.

In the embodiments of FIG. 5 and FIG. 6, a number of additional uniaxial or biaxial retardation films (not shown) may be positioned between the TFT substrate linear polariser 1 and the CF substrate linear polariser 12 to compensate the off-axis viewing degradation that can occur due to the LC layer 5 and/or the combination of the CF substrate linear polariser and the TFT substrate linear polarizer.

An aspect of the invention, therefore, is a liquid crystal device (LCD) that is configured for minimizing unwanted ambient light reflections particularly from internal components. In exemplary embodiments, the LCD includes a plurality of layers, the layers comprising from a viewing side: a first linear polariser; an external retarder that is made of a cyclic olefin polymer (COP) material or a cyclic olefin copolymer (COC) material; a colour filter substrate; a colour filter layer; an internal reactive mesogen (RM) retarder alignment layer; an internal reactive mesogen (RM) retarder; a liquid crystal (LC) layer; and a second linear polarizer. The LCD may include one or more of the following features, either individually or in combination.

In an exemplary embodiment of the LCD, the external retarder and the internal RM retarder are configured such that optical properties of the external retarder and the internal RM retarder are matched to negate each other for light passing through the external retarder and the internal RM retarder.

In an exemplary embodiment of the LCD, the matched optical properties include light polarization control function.

In an exemplary embodiment of the LCD, an azimuthal angle between the first and second linear polarisers is 90°, an azimuthal angle between the first linear polariser and the external retarder is 45°, and an azimuthal angle between the internal RM retarder and external retarder is 90°.

In an exemplary embodiment of the LCD, the internal RM retarder is made of a positive uniaxial material.

In an exemplary embodiment of the LCD, the external retarder is made of a positive uniaxial material.

In an exemplary embodiment of the LCD, the external retarder is a laminated film that is configured as a quarter wave plate.

In an exemplary embodiment of the LCD, the internal RM retarder is a film that is configured as a quarter wave plate.

In an exemplary embodiment of the LCD, the internal RM retarder and the external retarder layer each has a retardation value in a range of 110 nm to 165 nm measured at 550 nm.

In an exemplary embodiment of the LCD, a difference in retardation values measured at 550 nm between the internal RM retarder layer and the external retarder layer is in a range of 0 nm to 10 nm.

In an exemplary embodiment of the LCD, R450 denotes retardation of blue light measured at 450 nm, R550 denotes retardation of green light measured at 550 nm, and R650 denotes retardation of red light at 650 nm; and the internal RM retarder layer has a value of R450/R550 in a range of 0.95 to 1.07 (1.01±0.06), and a value of R650/R550 in a range of 0.93 to 1.05 (0.99±0.06).

In an exemplary embodiment of the LCD, R450 denotes retardation of blue light measured at 450 nm, R550 denotes retardation of green light measured at 550 nm, and R650 denotes retardation of red light at 650 nm; and the external retarder has a value of R450/R550 in a range of 0.95 to 1.07 (1.01±0.06), and a value of R650/R550 in the range of 0.93 to 1.05 (0.99±0.06).

In an exemplary embodiment of the LCD, the LCD further includes an electromagnetic shielding layer that is deposited onto the color filter substrate and is positioned between the colour filter substrate and the colour filter layer.

In an exemplary embodiment of the LCD, the electromagnetic shielding layer is a conductive layer.

In an exemplary embodiment of the LCD, the LCD further includes a first planarization layer deposited on a non-viewing side of the colour filter layer that eliminates surface roughness of the colour filter layer.

In an exemplary embodiment of the LCD, the LCD further includes a second planarization layer deposited on the non-viewing side of the internal RM retarder that eliminates surface roughness of the internal RM retarder.

In an exemplary embodiment of the LCD, the LCD further includes a photospacer layer deposited on a non-viewing side of the internal RM retarder that is configured to maintain uniform thickness of the LC layer.

In an exemplary embodiment of the LCD, the LCD further includes an anti-reflection film located on the viewing side of the first linear polarizer.

In an exemplary embodiment of the LCD, the LCD further includes at least a one C-plate retarder deposited between the external retarder and internal RM retarder.

Although the invention has been shown and described with respect to a certain embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

INDUSTRIAL APPLICABILITY

Embodiments of the present invention are applicable to many display devices, and a user may benefit from the capability of the display to provide improved display visibility under higher ambient illumination, without the need for increased backlight power, particularly when the display is battery powered. Examples of such devices include mobile phones, personal digital assistants (PDAs), tablet and laptop computers, desktop monitors, and digital cameras.

REFERENCE SIGNS LIST

1 TFT Linear Polariser
2 TFT Substrate
3 Active Matrix Electrodes
4 First LC Alignment layer
5 LC
6 Second LC Alignment Layer
7 Internal RM Retarder
8 Internal RM Retarder Alignment Layer
9 Colour Filter (CF) Layer
10 CF Substrate
11 External Retarder λ/4
12 CF Substrate Linear Polariser
13 Anti-reflection Film
61 Photospacer Layer
62 Second Planarization Layer
81 First Planarization Layer
91 Electromagnetic Interference Shielding
95 C-plate retarder
100 Conventional FFS or IPS Type LCD
101 FFS or IPS type LCD With External and Internal Retarders
102 Another FFS or IPS type LCD With External and Internal Retarders
103 Yet another FFS or IPS type LCD With External and Internal Retarders
200 Viewing Side
300 Backlight Unit

What is claimed is:

1. A liquid crystal device (LCD) comprising a plurality of layers, the layers comprising from a viewing side:
a first linear polariser;
an external retarder that is made of a cyclic olefin polymer (COP) material or a cyclic olefin copolymer (COC) material;
a colour filter substrate;
a colour filter layer;
an internal reactive mesogen (RM) retarder alignment layer;
an internal reactive mesogen (RM) retarder;
a liquid crystal (LC) layer; and
a second linear polarizer;
wherein:
R450 denotes retardation of blue light measured at a wavelength of 450 nm, R550 denotes retardation of green light measured at a wavelength of 550 nm, and R650 denotes retardation of red light measured at a wavelength of 650 nm; and
the internal RM retarder layer has a value of R450/R550 in a range of 0.95 to 1.07 (1.01±0.06), and a value of R650/R550 in a range of 0.93 to 1.05 (0.99±0.06).

2. The LCD of claim 1, wherein the external retarder and the internal RM retarder are configured such that optical properties of the external retarder and the internal RM retarder are matched to negate each other for light passing through the external retarder and the internal RM retarder.

3. The LCD of claim 2, wherein the matched optical properties include light polarization control function.

4. The LCD of claim 1, wherein an azimuthal angle between transmission axes of the first and second linear polarisers is 90°, an azimuthal angle between the transmission axis of the first linear polariser and an optical axis of the external retarder is 45°, and an azimuthal angle between an optical axis of the internal RM retarder and the optical axis of the external retarder is 90°.

5. The LCD of 4 claim 1, wherein the internal RM retarder is made of a positive uniaxial material.

6. The LCD of claim 1, wherein the external retarder is made of a positive uniaxial material.

7. The LCD of claim 1, wherein the external retarder is a laminated film that is configured as a quarter wave plate.

8. The LCD of claim 1, wherein the internal RM retarder is a film that is configured as a quarter wave plate.

9. The LCD of claim 1, wherein the internal RM retarder and the external retarder layer each has a retardation value in a range of 110 nm to 165 nm measured at a wavelength of 550 nm.

10. The LCD of claim 9, wherein a difference in retardation values measured at a wavelength of 550 nm between the internal RM retarder layer and the external retarder layer is in a range of 0 nm to 10 nm.

11. The LCD of claim 1, wherein
the external retarder has a value of R450/R550 in a range of 0.95 to 1.07 (1.01±0.06), and a value of R650/R550 in the range of 0.93 to 1.05 (0.99±0.06).

12. The LCD of claim 1, further comprising an electromagnetic shielding layer that is deposited onto the color filter substrate and is positioned between the colour filter substrate and the colour filter layer.

13. The LCD of claim 12, wherein the electromagnetic shielding layer is a conductive layer.

14. The LCD of claim 1, further comprising a first planarization layer deposited on a non-viewing side of the colour filter layer that eliminates surface roughness of the colour filter layer.

15. The LCD of claim 14, further comprising a second planarization layer deposited on the non-viewing side of the internal RM retarder that eliminates surface roughness of the internal RM retarder.

16. The LCD of claim 1, further comprising a photospacer layer deposited on a non-viewing side of the internal RM retarder that is configured to maintain uniform thickness of the LC layer.

17. The LCD of claim 1, further comprising an anti-reflection film located on the viewing side of the first linear polarizer.

18. The LCD of claim 1, further comprising at least one C-plate retarder deposited between the external retarder and internal RM retarder.

* * * * *